United States Patent [19]

Kenyon

[11] Patent Number: 4,819,866

[45] Date of Patent: Apr. 11, 1989

[54] DISPENSING AND DEPOSIT MACHINE

[76] Inventor: Anthony Kenyon, 124 Belsize Rd., London, England, NW6 4BG

[21] Appl. No.: 79,074

[22] Filed: Jul. 29, 1987

[30] Foreign Application Priority Data

Jul. 31, 1986 [GB] United Kingdom ................ 8618689

[51] Int. Cl.[4] ............................................ B65G 11/04

[52] U.S. Cl. ..................................... 232/43.3; 232/44; 109/24.1

[58] Field of Search .......................... 232/44, 43.3, 16; 235/379; 109/24.1, 66, 45, 47

[56] References Cited

U.S. PATENT DOCUMENTS 3,836,980 9/1974 Grosswiller et al. ............ 232/44 X
4,312,277 1/1982 Graef et al. ....................... 232/44 X
4,557,352 12/1985 Tschappat ...................... 109/24.1 X
4,615,280 10/1986 Shoop et al. ....................... 109/24.1
4,649,832 3/1987 Hain et al. ........................ 109/66 X
4,665,839 5/1987 Heyl ............................. 232/43.3 X

FOREIGN PATENT DOCUMENTS 2046975 11/1980 United Kingdom .

*Primary Examiner*—Robert W. Gibson, Jr.
*Attorney, Agent, or Firm*—Helfgott & Karas

[57] ABSTRACT

A dispensing and deposit machine comprises a container from which goods are dispensed or deposited. Instructions for a dispensing or deposit transaction are provided by a user from a vehicle. The user operates a data input, a dispensing and deposit component, which is mounted on a first carriage mechanism, controlled to move the component to a position adjacent a window of the vehicle. The goods to be dispensed or deposited are conveyed to the data input, dispensing and deposit component from the container and vice versa by a carriage device consisting of an enclosure movable by a second carriage mechanism.

35 Claims, 4 Drawing Sheets

DISPENSING AND DEPOSIT MACHINE

TECHNICAL FIELD AND BACKGROUND ART

The present invention relates to dispensing and deposit machines, that is machines whereby goods of some nature (for example money, food and drink, confectionery, etc) may be automatically dispensed to, or deposited by a user.

The present invention was primarily developed to improve machines of the type disclosed by our copending British patent application No. 8525362. The type of machine disclosed in the aforementioned copending application is intended for use by persons in a vehicle parked adjacent the machine. Whereas conventional machines for automatic dispensing and/or deposit are essentially static, this type of machine has a mobile "data input and, dispensing and deposit component" which is moved to a dispensing position adjacent a window of the vehicle through which it can conveniently be operated by the user. The component is provided with facilities whereby the user can instruct the machine and is capable of dispensing goods from the machine to the user while at the dispensing position. Alternatively the user may employ the machine to make a deposit of, for example, money, in which case the user inserts the goods into the component at the dispensing position, and the component then conveys them to, and deposits them in a safe storage enclosure of the machine.

Drive up machines of the type described are more easily and securely operated by a user from a vehicle than is the case with conventional static type dispensing or deposit machines. However, at least when used for dispensing goods the drive-up machine must go through the following procedure. As the vehicle parks adjacent the machine the component is at an initial rest position from which it is moved, by a carriage mechanism, to the dispensing position. At this point the user operates the component in order to instruct the machine as to the transaction, for example to withdraw money from a financial account. The machine responds to such instructions by returning the component to a transfer position adjacent a safe enclosure of the machine, at which position goods to be dispensed are transferred to the component. The component, carrying the goods, returns to the dispensing position and dispenses the goods to the user. Finally the component and the machine return to its rest position ready for the next transaction.

The movements through which the component must go to complete a transaction (that is the cycle starting from the rest position and finishing at the rest position), take time and it is an object of the present invention to reduce the duration of the transaction.

Although the present invention was primarily devised for use with machines of the drive-up type it also has application to static or pedestrian walk-up type automatic dispensing and deposit machines. A problem encountered, especially with money dispensing machines, is that a high level of security must be provided for a safe part of the machine wherein is stored the money to be dispensed. This is generally provided by a large and expensive armoured safe. In conventional machines the data input and dispensing component projects from one surface of the unit enclosing the safe. Most frequently it is necessary to have this type of dispensing and deposit machine sited with the safe adjacent an external wall of a building with the data input component extending through an aperture in the wall to be available for use by pedestrians outside the building.

It is desirable to be able to install dispensing and deposit machines in free standing locations, remote from a building or wall. However, known forms of machines are ill-suited to such siting since the safe is integrally formed with the component and is therefore, necessarily accessible and insecure.

It is an object of the present invention to attempt to enable dispensing and deposit machines to be readily installed in a wider range of sites than is feasible with conventional machines, including sites remote from a building and to attempt to improve the security of such machines.

STATEMENT OF INVENTION

According to the present invention there is provided a dispensing and deposit machine comprising a container in which goods may be stored, a component, located remote from the container whereby a user may instruct the machine to dispense goods or receive goods to be deposited, and carriage means acting between the container and the component in response to instructions from the user to collect goods from the container and transfer the goods to the component to be dispensed or to collect goods deposited by the user in the component and transfer them to a container.

The container can take different forms. In the case of dispensing money, the container can be a safe or security box. In the case of the container being used for other goods it may be adapted suitably to allow such goods to be stored and dispatched easily when required.

Further according to the present invention there is provided a dispensing and deposit machine of drive-up type comprising a container, a component operable by ea user to instruct the machine as to a transaction and which is mounted on a carriage mechanism, sensing means capable of sensing the presence of a vehicle parked adjacent the machine and guiding the carriage mechanism to move the component to a position adjacent an open window of the vehicle from where the user is capable of instructing the machine as to the transaction, and a carriage means acting between the container and a dispensing position adjacent the open window of the vehicle to respond, according to the instructions of the user, by transfering goods from the container to the dispensing position to dispense the goods to the user, or transferring goods deposited by the user at the dispensing position, to the container for deposit.

The carriage means may take a number of different forms depending primarily on the type of machine in which it is used. Preferably where the machine is of the drive-up type, it comprises an enclosure which initially rests against an aperture of the container through which goods may be transferred from the container to the enclosure. The enclosure is mounted on a carriage mechanism which is preferably the same carriage mechanism as that used to move the component. When the machine is actuated by the sensors detecting the presence of a vehicle the component is moved to the dispensing position where it is operated by the occupant of the vehicle to instruct the machine as to what transaction is to be made (that is to dispense goods or accept the deposit of goods).

As detailed in our copending application No. 8525362, the instructions to the machine may be provided by the user by the application of a personal security card and security code in the conventional way. When the goods are ordered by the user, via the keyboard, the standing of the users account may be checked by reference to a control computer, remote from the machine in order to confirm that the users account contains sufficient funds and to debit the account by the value of the goods. The central computer will, amongst other functions, authorise and record the flow of funds into and out of a large number of accounts as is generally the case with modern banking facilities. Once the central computer has accepted the instructions, goods are transferred according to the instructions, into the enclosure. The enclosure is then moved by its carriage mechanism from the aperture to the dispensing position. In one preferred embodiment of the invention the enclosure is moved into contact with the component which is adapted to receive the goods from the enclosure and dispense them to the user. Alternatively, the carriage means may convey goods directly to a second dispensing position adjacent the component in order to dispense the goods directly to the user. Once the goods have been dispensed to the user, both the component and the enclosure are returned to their initial rest position ready for another transaction.

In an alternative form of the invention the carriage means may comprise a conduit which continuously connects the safe to the component. The conduit may be flexible or rigid as desired. The goods to be dispensed are appropriately packaged and placed in the container. When a transfer takes place, the goods are transferred to the conduit and to the component by transfer means acting on the goods in the conduit. The component is adapted to receive goods from the conduit and dispense them directly to the user. The transfer means may be of any suitable type, for example, mechanical electro-magnetic, pneumatic or hydraulic type as appropriate to the specific application of the machine.

The carriage means described above improves the operation of the machine in two important characteristics. Firstly, the container may be located further from the component than can be readily achieved with known machines, and the security of the machine can thus be enhanced. Secondly, the speed of operation of the machine is increased, minimising the period a user must wait during a transaction thereby making the machine safer and more convenient to use and enabling the machine to serve more customers than previous proposals.

The invention may be used in order to enable the safe to be located remote from the component of dispensing and deposit machines of either drive-up or pedestrian walk-up type. For example, when used with a pedestrian type machine the component for data input may conveniently be located on the outer facing surface of an external wall of the building to be readily usable by pedestrians outside the building. The container may be placed at any convenient location within the building which may be quite remote from the component. The container and the component are connected by a carriage means, which preferably comprises a conduit provided with displacement means capable of conveying the goods through the conduit. When a user has completed instructing a machine by way of the component goods according to the instructions are transferred into the conduit and moved by the displacement means through the conduit to the component at which they are dispensed to the user. The goods stored in the container may be enclosed in packaging, adapted to be readily transferred through the conduit by the particular form of transport means used. The transport means may be of any particular type and may comprise pneumatic, hydraulic, electro-magnetic linear, or mechanical roller drives which act on or engage the goods or packaging in order to propel them through the conduit.

By enabling the container to be located remote from the component the invention makes it possible to site dispensing and deposit machines in a greater variety of locations than can be achieved with conventional machines, which can be used to enhance the security of the machine. This applies equally well to dispensing and deposit machines of the drive-up type in which carriage means which may be either of the previously described types, or a combination of the two, connect the component to a remotely located container. Thus the machine may be installed at, for example, a road side location with the safe located for example, in a building remote from the component or below ground level. Alternatively the safe may be located where desired e.g. above ground etc.

DRAWINGS

Embodiments of a dispensing and deposit machine constructed in accordance with the present invention will now be described by way of example only with reference to the accompanying illustrative drawings; in which, FIGS. 1 to 6 illustrate the construction and sequentially illustrate the operation of a drive-up type machine adapted to dispense money and incorporating the present invention, FIG. 7 illustrates a second embodiment of the invention as used with a pedestrian type machine for dispensing money wherein the container is located at a similar height to the component, FIG. 8 illustrates the third embodiment of the invention as used with a pedestrian walk-up type machine for dispensing money in which the container is located beneath the component, FIG. 9 illustrates a fourth embodiment of invention as used with pedestrian type machines for dispensing money and having the container located beneath the component.

DETAILED DESCRIPTION OF DRAWINGS

Figure 1:
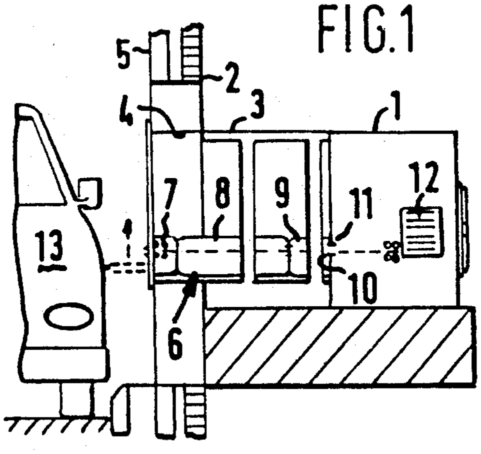
Figure 2:
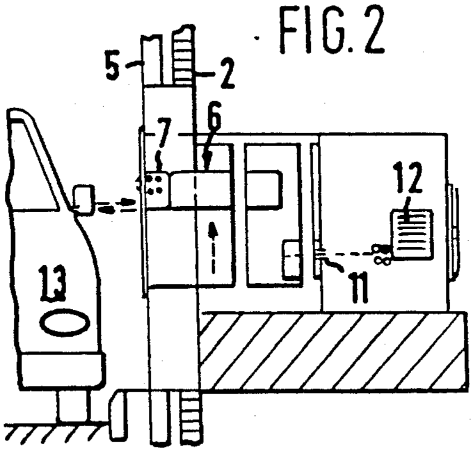

Referring to FIG. 1 the machine comprises a container in the form of a safe 1 sited within a building having an external wall 2 adjacent the side of a road. The safe is sited remotely from the wall 2 and a carriage mechanism 3 extends from a wall facing surface of the safe 1 through an aperture 4 in the wall 2 to project from a roadside face 5 of the wall 2. A data input, dispensing and deposit component 6 is mounted on the carriage mechanism 3 to be capable of being moved by the carriage mechanism vertically and horizontally away or towards the safe. The data input, dispensing and deposit component 6 comprises two sub-components, a control component 7 and a mounting component 8. The control component 7 has keyboard facilities to enable data to be entered into the machine secured to a mounting component 8 on an end thereof remote from the safe 1 to be extendable from the wall face 5. The control component 7 is laterally displaceable on a mounting securing it to the mounting component 8 while only the mounting component 8 is directly coupled to the carriage mechanism 3. The mounting component 8 and hence the control component 7 can be moved vertically and horizontally towards or away from the safe 1, by means of the carriage mechanism 3. In addition control component 7 can move laterally and independently of a mounting mounting component 8.

Also coupled to the carriage mechanism is a carriage means 9. This comprises an enclosure having a chamber capable of receiving money stored in and dispensed from the safe 1. Carriage means 9 can be moved by the carriage mechanism 3 both verticallly and horizontally towards and away from the safe so that it can be moved from a position adjacent the safe as shown in FIG. 1 to a position adjacent the end of mounting component 8 remote from the control component 7. When the carriage means 9 is in the position adjacent the safe an aperture 10 in the end of the carriage means 9 near to the safe, cooperates with a corresponding aperture 11 in the safe 1, so that money 12 stored in the safe 1 can be transferred from the safe 1 through apertures 11 and 10 into the chamber within the carriage means 9.

Figure 3:
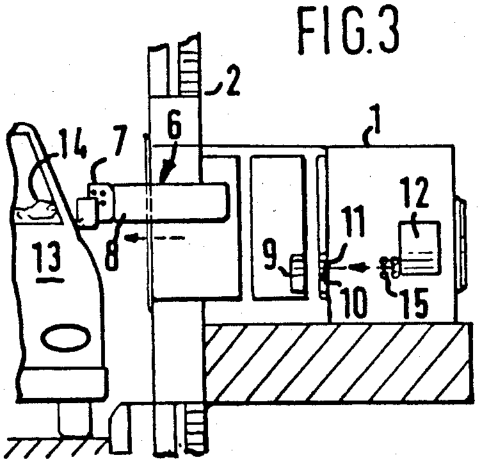
Figure 4:
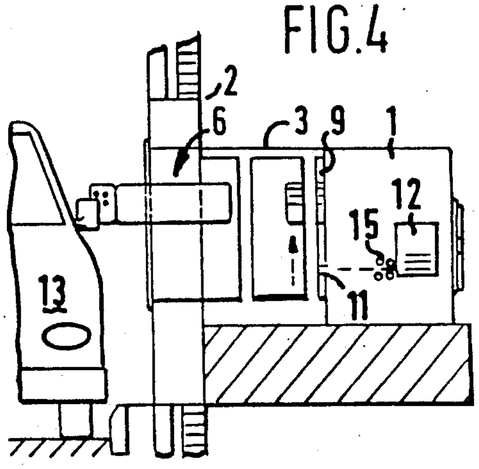
Figure 5:
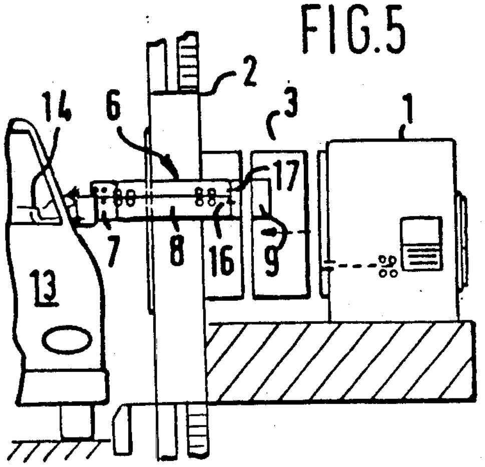

In operation a vehicle 13 parks adjacent the machine and is detected by sensing devices (not shown) which actuate the machine. Initially the component 6 is at a rest position on the carriage mechanism 3. When actuated the carriage mechanism moves the data input, dispensing and deposit component 6 vertically upwards so that the sensing device mounted on the control component 7 can determine the height of a sill of a window of the vehicle. When this height has been determined the vertical motion is stopped and the control component 7 is moved horizontally away from the wall until it is adjacent to the vehicle window as shown in FIG. 3. The control component 7 may then, if necessary, be moved laterally in relation to mounting component 8 to be ideally positioned for operation by the user 14. At this position the user 14 operates the controls of the control component 7 in order to instruct the machine as to the transaction. During the preceding operations of the machine it will be noted that the carriage means 9 remains in its rest position adjacent to the safe so that apertures 10 and 11 communicate. When the machine has been instructed, money 12 is transferred by motorised rollers 15 from the safe to the communicating apertures 10 and 11 into the chamber within the carriage means 9. At this point sensing devices (not shown) within the carriage means 9 detect the loading of money 12 into the chamber and actuate the carriage mechanism 3 to move the carriage means 9 upwardly until it is at the same height as the component 6, (as shown in FIG. 4). The carriage mechanism 3 then moves the carriage means 9 horizontally away from the safe 1 until one face of the carriage means 9 is in abutment with the end of the component 6 towards the safe 1. In this position a second aperture 16 in the carriage means 9 communicates with an aperture 17 in the component 6. Roller mechanisms (not shown) within the carriage means 9 are actuated by contact between the carriage means 9 and the component 6 and transfer the money from the carriage means 9 by way of apertures 16 and 17 into a chamber (not shown) within the component 6. More roller mechanisms within the chamber in component 6 engage the money and convey it through the chamber in the sub-component 8 and into the control component 7 where it is dispensed to the user 14, by way of a dispensing aperture (not shown).

Figure 6:
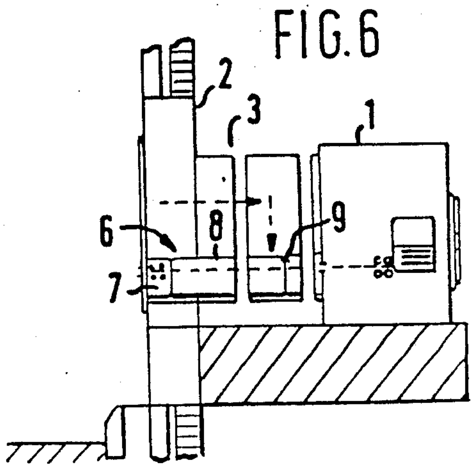

A sensing device (not shown) in the control component 7 detects withdrawal of the money by the user and actuates the carriage mechanism 3, which returns the component 6 and the carriage means 9 to the initial rest position (as shown in FIG. 6) ready for the next user.

It will be realised that with this machine the time required for the completion of a transaction is reduced in comparison with dispensing and deposit apparatus of the type disclosed by our copending British patent application No. 8525362, because the component 6 is not required to return to the rest position in order to collect the money from the safe before dispensing it to the user.

Figure 7:
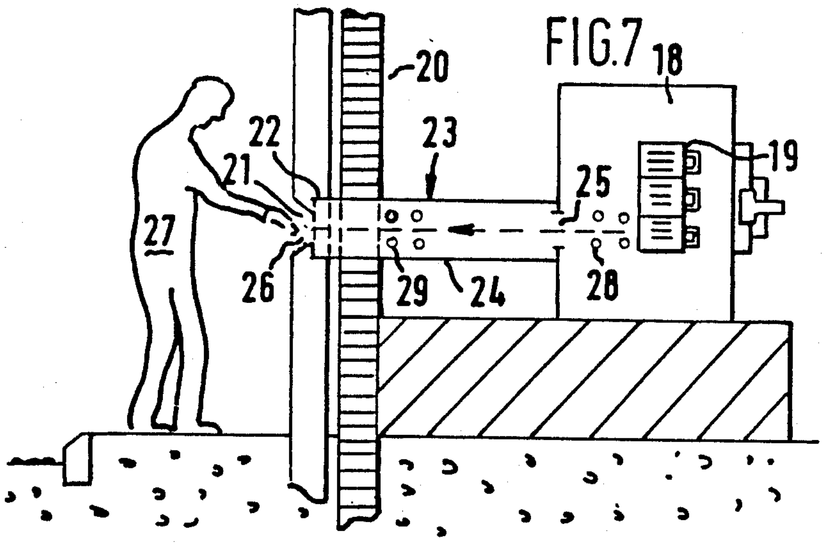
Figure 8:
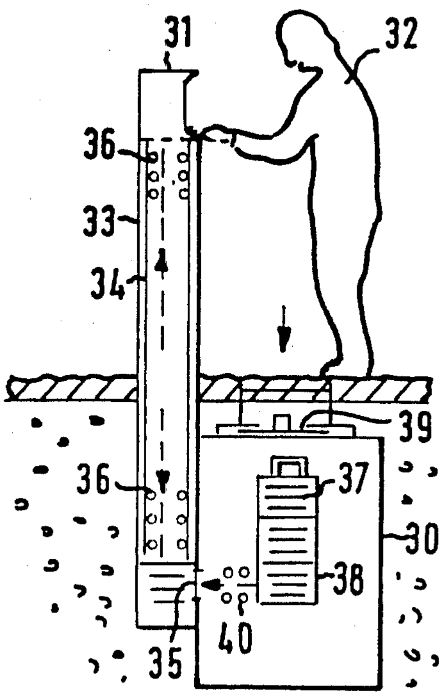
Figure 9:
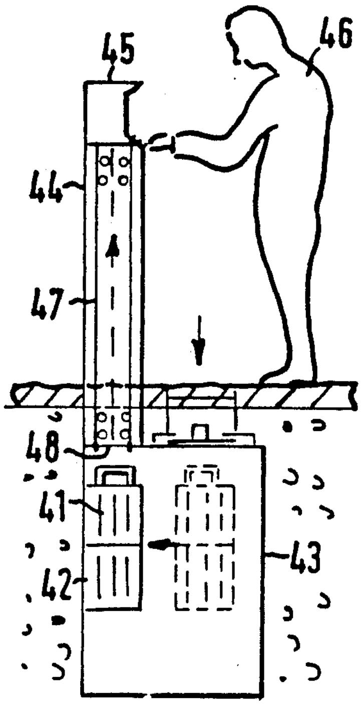

FIGS. 7, 8 and 9 illustrate embodiments of the machine used for dispensing money to pedestrians. Referring firstly to FIG. 7 the machine has a safe 18 wherein money is stored in known fashion in cassettes 19. In this particular example the safe 18 is stored behind an external wall 20 of a building, but unlike conventional money dispensing machines is spaced a considerable distance from the wall 20. A device 21 is installed in an aperture 22 in the wall and is provided with facilities for data input by means of which the user may instruct the machine. The device 21 is connected to the safe 18 by a carriage means 23 which is comprised of an elongated conduit 24 extending horizontally between the safe 18 and the device 21 to communicate with an aperture 25 in the safe 18 and a dispensing aperture 26 in the device 21.

The device 21 is provided with a touch sensitive display screen which displays directions and information to the user, and which enables the user to instruct the machine. In use a pedestrian user 27 operates the device 21 by use of the display screen and a personal security card (not shown) in order to instruct the machine as to the transaction, (for example to withdraw money from the machine). Having accepted the instructions money is withdrawn from the cassettes 19 within the safe and is transferred by rollers 28 to aperture 25 into the conduit 24. Rollers 29 within the conduit 24 engage the money as it is passed through aperture 25 and transfer it from the safe end of the aperture to the device 21. At the device 21 the money is ejected through the dispensing aperture 26 at which it is collected by the user 27, thus completing the transaction. It should be realised that although the embodiment of the invention illustrated by FIG. 7 has the safe behind the device 21, in practice the safe might be located anywhere within the building depending on which configuration happens to be convenient for the particular situation. Since the money is retained in the safe 18 remote from the external wall 20 of the building the security of the machine is enhanced since the safe 18 is less accessible to unauthorised persons and where the safe is, for example, within or adjacent a bank's vaults can be most conveniently refilled. A further advantage of the machine derives from the fact that the carriage means 23 can have a small cross-section so that the aperture 22 required in the wall 20 can be small in comparison with that required by conventional machines.

FIG. 8 shows another embodiment of the machine for pedestrian use. This embodiment of the invention is intended for installation at sites remote from a building and has a safe 30 securely installed in a well in the ground under a device 31. The device 31, by means of which a user 32 may instruct the machine as to the transaction, is supported at a convenient height above the ground by a hollow vertical pillar 33. Installed within the pillar 33 is a carriage means comprising an armoured conduit 34 which extends between the underside of the device 31, through the ground surface to an aperture 35 on one side facing surface of the safe 30. Rollers 36 capable of being actuated by motors (not shown) are installed with the conduit 34 to act between the aperture 35 and a dispensing aperture (not shown) in the device 31.

In use, money 37, packaged in cassettes 38, is loaded into the safe 30 by way of a safe door 39. The user 32 actuates controls on device 31 to instruct the machine as to the transaction. Where the transaction is a withdrawal, money 37 is extracted from the cassettes 38 by means of rollers 40 within the body of the safe 30 and transferred by the rollers 40 through the apertures 35 and into the conduit 34 where it is engaged by the rollers 36. The rollers 36 transfer the money 37 upwardly through conduit 34 to the device 31 where it is ejected through the aforementioned dispensing aperture 57. At this stage the user 32 may withdraw the money thereby completing the transaction.

FIG. 9 illustrates a fourth embodiment of the invention substantially similar to the embodiment of the invention illustrated in FIG. 8. As with the embodiment of the machine described above money 41 is packaged within cassettes 42 which are in turn stored in a subterranean safe 43. A vertical pillar 44 supports a device 45 at a convenient height above the ground for operation by a user 46. A carriage means 47 similar to that described in the embodiment of FIG. 8 is installed within pillar 44 to act between the base of the device 45 and the safe 43. However in this case carriage means 47 acts between the base of the device and an aperture 48 provided in an upward facing surface of the safe 43. Operation of the device is as has been described above for the other embodiments of this invention but the configuration of this machine is somewhat more compact than that of the previously described embodiment of FIG. 8.

The embodiments of the machine having a safe located below the ground are particularly well suited to use as free standing installations. With known free standing installations the safe is necessarily above ground and especially if located outside a building, the safe can be stolen without great difficulty by removing it with a crane or other heavy machinery. This is very difficult with a safe installed below ground level.

A further advantage of installing the safe beneath the ground as described in the embodiments of FIGS. 8 and 9 derives from providing the safe door in the top of the safe to be accessible by way of a man-hole cover in the ground surface. If the safe is installed beneath a road surface where a vehicle may park, the safe can be loaded from a vehicle having an access hatch in its underside and parked over the man-hole cover and safe. This feature improves the security of the machine during reloading.

Figure 10:
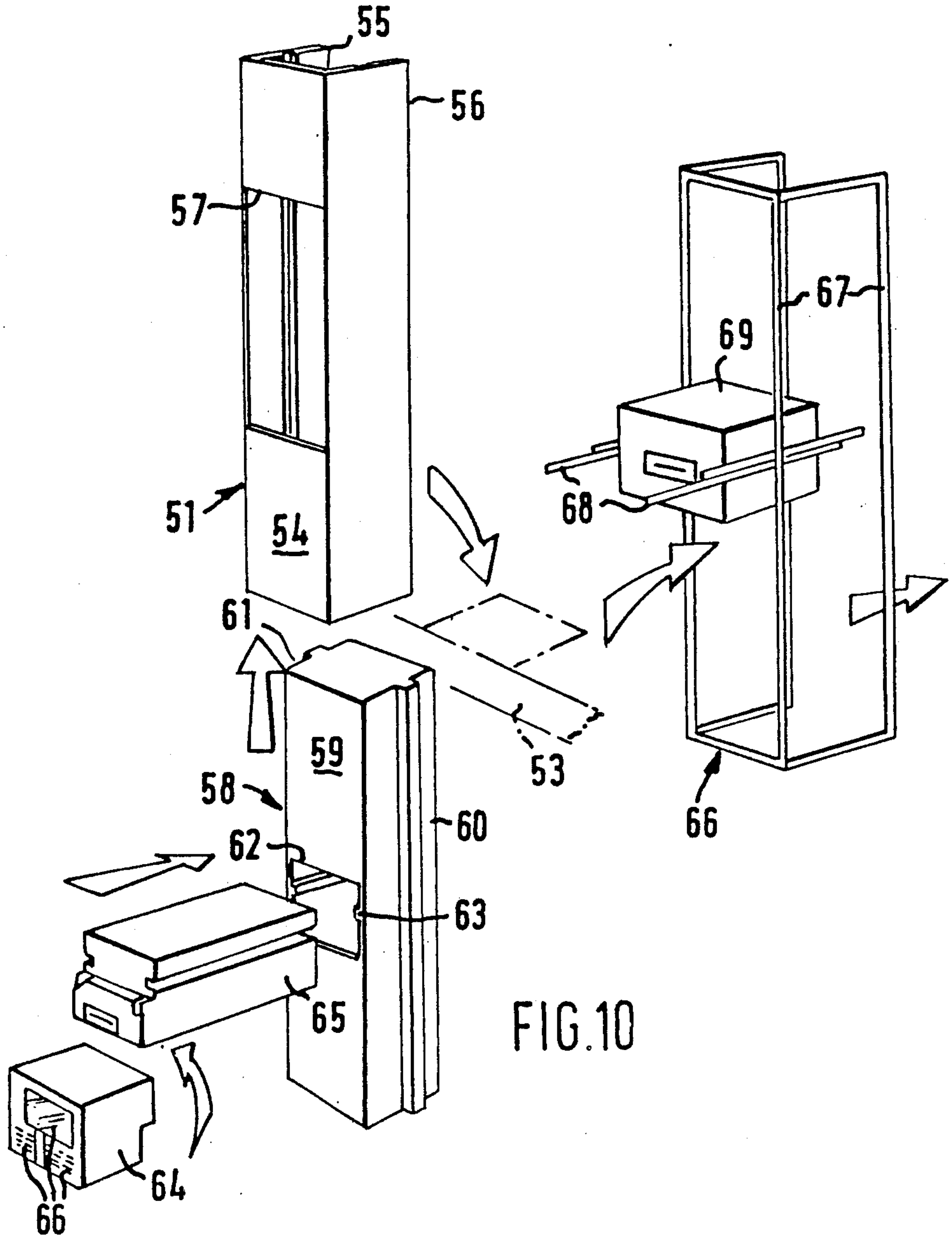
FIG. 10 illustrates an exploded view of a dispensing and deposit machine with a carriage mechanism suitable for drive-up type machines.
Figure 11:
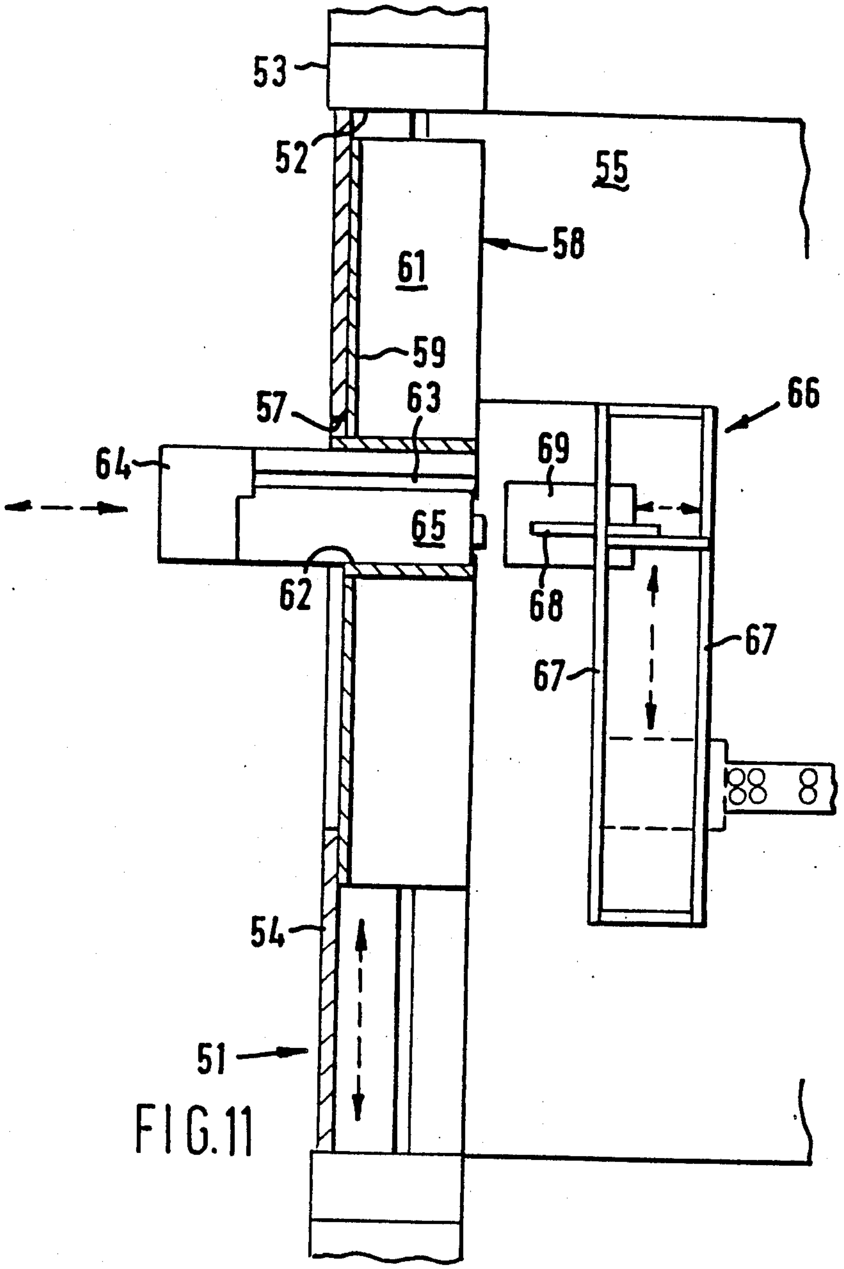
FIG. 11 is a sectional view of the machine shown in FIG. 10.

FIGS. 10 and 11 illustrate an embodiment of the machine having a carriage mechanism particularly suited to drive-up type machines. In this embodiment of the machine an elongated box section outer casing 51 which is installed vertically in a correspondingly shaped aperture 52 provided in an external wall 53 of a building. The casing has a front facing panel 54 which lies flush with the external surface of the wall 53. Two side panels 55 and 56 extend parallel to one another and rearwardly away from the vertical edges of the front panel 54. Provided in the panel 54 is an aperture 57.

A lift 58 comprises an elongate armoured box having elongate rectangular front panel 59 and side panels 60 and 61 extending rearwardly from the long edges of the front panel 59. The external cross section of the lift 58 corresponds to the internal cross section of the casing 57 and the lift 58 is installed within the casing 51 to be vertically displacable on interengaging guide runners formed on the outer and inner faces respectively of the side panels 60, 61, 55 and 56. Drive means (not shown) are provided to propel the lift 58 vertically up or down within the casing 51.

A rectangular aperture 62 is provided in the front panel 59 of the lift 58 and panels extend rearwardly from the edges of the aperture 62 to form a horizontal guide channel 63 through the panel 59 to the back of the lift 58.

An important feature of the machine is that the height of the panel 59 is sufficient to close completely the aperture 57 at and between the extreme limits of vertical displacement of the lift 58. Also at or between these limits the aperture 62 is in communication with the aperture 57. A device for data input and dispensing comprises a head 64 mounted to be laterally displaceable on a body 65. The head 64 is provided with a key board screen, and security card receptacle, 66 by which a user can instruct the machine as to a transaction in conventional manner. The head 64 and body 65 has a cross section adapted to be received within the aperture 62 and channel 63. The device is displacably received into the channel 63 so that the head 64 is towards the front of the machine. The body 65 is long in comparison with the head 64 and is engaged by displacement means within the channel 63 which enable the body 65 and hence the head 64 to be extended horizontally away from the front of the machine through the aperture 57.

Mounted rearwardly of the lift 58 and secured to the side panels 55 and 56 are vertical guide tracks 67. Secured to the guide tracks 67 to be vertically displacable thereon are horizontally extensible runners 68. The runners 68 are engaged by drive means capable of displacing them vertically up or down the tracks 67 which extend over the same depth as the aperture 57.

An enclosure 69 is carried on the runners 68 to be horizontally extendable from the frame 66.

In operation the machine is at a rest position which the lift 58 and enclosure 69 are at their lowest possible positions. When a vehicle parks adjacent the machine, its presence is detected by sensors (not shown) mounted on the head 64 which guide the machine to raise the lift 58 (and thereby the head 64 and body 65) until the head 64 is at the same height as a window of the vehicle. At this position the lift 58 is stopped and the body 65 is moved horizontally to bring the head 64 up to the window. If desired the head 54 can move laterally on its approach to the window in order to be ideally located for operation by a user occupant of the vehicle. The user applies his security card and code to the machine by way of the facilities provided on the head 54 and instructs the machine to dispense a specified amount of money.

A check is made with a central remote computer to confirm that the users account or credit is adequate for the requested sum. If the request is accepted, money is transferred by a roller mechanism 70 from a safe (not shown) located rearwardly of the machine into a chamber within the enclosure 69 by way of an aperture (not shown) in the rear of the enclosure 69. Sensors within the enclosure 69 detect the receipt of the money and in response the enclosure 69 is moved upwardly on tracks 67, until it is at the same height as the body 65. At this position the upward motion is stopped and the enclosure 69 is moved horizontally away from the frame 66 until a front face of the enclosure abuts a rear face of the body 65. In this position apertures (not shown) in the rear and front faces of the body 65 and enclosure 69 communicate in order to allow the money to be displaced from the enclosure into the body 65. The money is then transferred through the body 65 and into the head 64 from which it is dispensed to the user.

It will be realised from the construction of this machine that the carriage mechanism prevents access, from the front of the machine, to any vulnerable features of the machine at all times. Thus the security of the machine is exceptionally good. In addition to this advantage the machine can be made both robust and compact, due to the large box section members and components without incurring the penalties of relatively slow movement of a carriage mechanism or requiring large and powerful motors in order to move a heavy carriage mechanism necessitated by security requirements.

In an alternative embodiment of the machine (not shown) the carriage means may comprise a conduit extending between a device by means of which a user may instruct the machine as to the transaction, and the safe in which money is stored. However, unlike the previously described machines the goods are transferred through the conduit, from the safe to the device by pneumatic or hydraulic means. In this type of machine the goods are pre-packed for storage in the safe, in packaging which fits closely into the conduit. When the goods are to be dispensed they are transferred from the safe into the conduit and a pump in the machine forces fluid into the conduit on one side of the packaging in order to propel the packaging through the conduit to the device where it is dispensed.

In another embodiment of the invention (not shown) the goods are transferred, from the safe, through a conduit of the carriage means, to the device, by an electromagnetic linear drive which acts on packaging within which the goods are stored.

In still another embodiment of the machine (not illustrated) it is proposed that the container or safe may be installed above the ceiling of a chamber accessible by pedestrians or vehicles. A device for data input and dispensing or deposit is mounted on a pillar which may be fixed or extensible but which projects downwardly from the ceiling to present the device for convenient access by a user. Carriage means installed in the pillar conveys goods, according to the instructions of a user, from the safe to the device to be dispensed, or from the device to safe for deposit. This embodiment of the machine increases the number of sites suitable for the installation of such machines. The feature of the pillar being extensible which is also applicable to the machines as illustrated in FIGS. 8 and 9 which have the safe below ground, can enable the entire device and pillar to be withdrawn into a secure cavity above or below ground, as appropriate. This is a useful feature where the site of the machine may at times cause an inconvenient obstruction. It may also be used to improve the security of the machine. By providing the machine with suitable sensors (e.g. heat sensors or shock load sensors) any attempt to damage or gain entrance to the pillar or device can be automatically detected. The pillar can then be withdrawn into the cavity where it is much less accessible to alleviate or prevent serious damage to the machine.

It should be realised that although all the previous embodiments of the invention have been described with reference to the machine dispensing money, the machine can readily be adapted to enable the user to deposit money for storage within the safe. In this instance the carriage means would act to convey money deposited by the user at the device, from the device into a safe.

Although the invention was primarily devised for use with money dispensing and deposit machines, the invention can readily be adapted to dispense other goods, such as confectionery, foods stuffs or many other small items. The invention as described for use with pedestrian machines may be especially advantageous where used to dispense a wide range of goods. In this case the container is likely to be exceptionally large and therefore particularly difficult to locate conveniently if it must be very close to the component for data input and dispensing. A further advantage of the invention lies in the feature that several carriage means may be used to act between one container or safe and a corresponding number of devices.

I claim:

1. A dispensing machine comprising a container in which goods may be stored, at least one component, located remote from the container whereby a user may instruct the machine to dispense goods, and carriage means acting between the container and the component in response to instructions from the user to collect goods from the container and transfer the goods to the component to be dispensed.

2. A machine according to claim 1 in which the carriage means comprises an enclosure mounted on a carriage mechanism; said enclosure being adapted to receive goods for transfer, and said carriage mechanism capable of conveying said enclosure between a position adjacent the container and a position adjacent the component in order to transfer goods between the container and component.

3. A machine according to claim 1 in which the carriage means comprises a conduit extending between the container and the component, means for introducing the goods into the conduit, and transfer means installed in the conduit to convey the goods between the container and the component.

4. A machine according to claim 3 in which the transfer means includes linear mechanisms.

5. A machine according to claim 3 in which the goods are pre-packed for storage in the container, said packaging being adapted to be acted on by the transfer means and to prevent damage to the goods in transit.

6. A machine according to claim 1 in which the component is supported by a member projecting from a substantially protective barrier which is interposed between the container and the component.

7. A machine as claimed in claim 6 in which the protective barrier comprises a substantially impenetrable shield.

8. A machine according to claim 6 in which the projecting member is displacable by a carriage mechanism capable of retracting the component and member behind the protective barrier to be inaccessible.

9. A machine according to claim 8 provided with sensors to detect any abuse of the machine and respond by retracting said component and member behind the protective barrier.

10. A machine according to claim 9 in which said sensors include impact sensors.

11. A machine according to claim 9 in which said sensors include thermal sensors.

12. A machine according to claim 7 in which the protective barrier comprises the ground.

13. A machine according to claim 7 in which the protective barrier comprises a wall.

14. A machine according to claim 7 in which the protective barrier comprises a ceiling.

15. A machine according to claim 1 and adapted to dispense and receive money.

16. A machine according to claim 15 in which the container is a safe.

17. A machine according to claim 1 in which a single container is connected by a carriage means to at least two components.

18. A machine according to claim 1 in which the component is adapted to permit a user to instruct the machine to receive goods to be deposited and the carriage means acts between the container and the component in response to depositing instructions from the user to collect goods deposited by the user in the component and transfer said goods to the container.

19. A machine according to claim 4 in which said linear mechanisms are mechanical.

20. A machine according to claim 4 in which said linear mechanisms are pneumatic.

21. A machine according to claim 4 in which said linear mechanisms are hydraulic.

22. A machine according to claim 4 in which said linear mechanisms are electromagnetic.

23. A machine according to claim 4 in which the linear mechanisms are a combination of mechanical and electromechanical mechanisms.

24. A drive-up type machine having at least one of a goods dispensing facility and goods depositing facility and comprising a container, a component operable by a user to instruct the machine as to a transaction and which is mounted on a first carriage mechanism, sensing means capable of sensing the presence of a vehicle parked adjacent the machine and guiding the first carriage mechanism to move the component to a position adjacent an open window of the vehicle from where the user is capable of instructing the machine as to the transaction, and a carriage means acting between the container and a dispensing position adjacent the open window of the vehicle to respond, according to the instructions of the user, by transferring goods between the container and the dispensing position to effect a transaction.

25. A machine according to claim 24 in which the carriage means comprises an enclosure mounted on a second carriage mechanism, said enclosure being adapted to receive goods from or transfer goods to the container and the component, and said second carriage mechanism capable of conveying said enclosure between a position adjacent the container at which the goods can be received from or transferred to the container and a position adjacent the component at which the goods can be transferred to or received from the component in order to transfer goods from the container to the component to be dispensed, or from the component to the container for deposit.

26. A machine according to claim 24 in which the carriage means comprises an enclosure mounted on a second carriage mechanism, said enclosure being adapted to receive goods from or transfer goods to the container, the second carriage mechanism being capable of conveying the enclosure between a position adjacent the container at which the goods can be received or transferred into the enclosure and a dispensing position at which the goods can be transferred between the enclosure and the user.

27. A machine according to claim 24 in which the carriage means comprises a flexible and extensible conduit having one end connected to the container and the other end connected to the component, means for introducing the goods into the respective ends of the conduit from the container or the component and transfer means to convey the goods through the conduit to the other end of the conduit to transfer the goods to the component to be dispensed or to the container for deposit.

28. A machine according to claim 27 in which the conduit is articulate and extensible to follow the motions of the component.

29. A machine according to claim 27 in which the transfer means comprises any of mechanical, pneumatic, hydraulic or electromagnetic linear mechanisms or any combination of them.

30. A machine according to claim 27 in which the goods are pre-packed for storage in the container, said packaging being adapted to be acted upon by the transfer means and to prevent damage to the goods in transit.

31. A machine according to claim 24 in which the container is remote from the component.

32. A machine according to claim 24 adapted to dispense money.

33. A machine according to claim 24 in which the container comprises a safe.

34. A machine according to claim 24 in which said first carriage mechanism comprises a fixed mounted casing having an outer facing panel in which is provided an elongate vertically extending aperture, a lift mounted in said casing and behind said outer facing panel to be vertically movable and having a front facing panel behind and is sliding contact with the rear surface of said outer facing panel said front facing panel being of sufficient height and width to prevent access to the interior of the machine by way of the aperture when the lift is in any position, and a data input and dispensing component having a control part mounted to be laterally movable on a body part, said data input and dispensing component being received in a passage of complementary cross section in said front facing panel to be horizontally extensible through said aperture thereby enabling the control part to be moved to the dispensing position.

35. A data input and dispensing component as claimed in claim 34 in which the second carriage mechanism comprises fixed vertical tracks mounted rearwardly of the lift, horizontally extensible runners mounted on said tracks to be vertically displaceable and an enclosure mounted on said runners to be horizontally extensible from said tracks, enabling the enclosure to be moved between a position adjacent the container and a position adjacent the back face of the body part of the data input and dispensing component.

* * * * *